Patented Nov. 6, 1945

2,388,613

UNITED STATES PATENT OFFICE 2,388,613

MANUFACTURING SOLID PRODUCTS

Harry Keller, St. Louis, Mo., assignor to Monsanto Chemical Company, St. Louis, Mo., a corporation of Delaware No Drawing. Application February 15, 1943, Serial No. 475,971

7 Claims. (Cl. 106—170)

The present invention relates to synthetic materials having rubber-like physical characteristics and more particularly to rubbery compositions derived from the thermal reaction of ethyl cellulose with certain substituted polyphenyl hydrocarbons, certain auxiliary resins and certain hydrogenated fatty acid esters.

Elastomers, or "lastics" as they are otherwise termed, are defined in the Condensed Chemical Dictionary, Third Edition, 1942 (Rhinehold Publishing Corporation), pages 265 and 288, as new materials of synthetic origin possessing outstanding elasticity or rubberiness and prepared by a variety of methods; for example, (1) by chemical reaction (2) by polymerization, or (3) by formulation. By suitable treatment and chemical formulation, products of widely different characteristics may be obtained, ranging from hard brittle masses to soft elastic masses. Elastomers possess, in general varying degrees of resistance to deterioration under conditions which cause natural rubber to fail rapidly; for example, attack by gasoline, oils and lubricants, chemical solvents, sunlight, ozone, atmospheric oxygen, heat and other agencies.

Various attempts have been made to produce plastics by incorporating a plasticizer, and in some instances a resin, with ethyl cellulose. The materials so produced were, in some cases, capable of being formed into pliable or flexible films, but were in no sense possessed of the rubbery characteristics which distinguish elastomers from plastics. In other words, there is a clear distinction between a plastic and an elastomer.

The object of the present invention is to provide novel elastomers derived from ethyl cellulose and having utility as rubber substitutes for many of the purposes for which rubber is used.

A further object is to provide novel elastomers having utility as extenders for synthetic rubbers.

A further object is to provide novel elastomer compositions having utility as dipping agents and coating emulsions and particularly as substituted for all or part of the rubber normally used in compositions for this purpose.

Another object is to provide a process for preparing the novel elastomers and elastomer compositions of this invention.

Further objects will appear from the detailed description in which will be set forth a number of embodiments of this invention; it is to be understood, however, that this invention is susceptible of various embodiments within the scope of the appended claims.

The application embodying the present invention is a continuation-in-part of my co-pending application Serial Number 429,952 filed February 7, 1942.

According to the present invention generally stated, elastomers are prepared from a mixture comprising ethyl cellulose and at least one normally solid crystalline substituted polyphenyl hydrocarbon such as ortho, meta and para diphenyl benzene, ortho, meta and para nitro diphenyl and others. An auxiliary resin such as a phenol aldehyde thermo-setting resin, a polycoumarone-indene resin or an alkyd resin may also be employed either in place of part of the polyphenyl hydrocarbon or in addition thereto. A hydrogenated fatty acid ester is also desirably employed as a constituent of the reaction mixture.

The auxiliary resin serves to supplement or extend the function of the substituted polyphenyl hydrocarbon in the thermal reaction from which the elastomer emerges. The hydrogenated fatty acid ester also serves to supplement the function of the substituted polyphenyl hydrocarbon. Likewise, in the employment of two or more substituted polyphenyl hydrocarbons, the second and subsequent hydrocarbons may be considered as supplementing or extending the function of the first hydrocarbon in the reaction. The term "extender" is employed hereinafter to designate the resin or the additional substituted polyphenyl hydrocarbons employed in some instances in the practice of this invention. The use of an extender in this respect has the advantage of avoiding any substantial tendency for blooming or reversion to take place when the limits of the compatibility of a selected substituted polyphenyl hydrocarbon are approached. Likewise, as will be described hereinafter, the elastomers of the present invention may be employed to supplement or extend the various synthetic rubbers, and in this respect, the term "synthetic rubber extender" is used hereinafter.

The mixture is heated in a suitable reaction vessel, for example, an oil-jacketed mixer, at reaction temperatures within the range of 140°–240° C. and for a period of time ranging from 20 minutes to several hours or longer. Under these conditions, the components of the reaction mixture form a homogeneous viscous liquid which, upon cooling, becomes a rubbery solid.

It is a feature of the present invention that dipping mediums embodying the novel elastomers of the present invention can be prepared readily by dispersing the elastomer in an organic solvent such as benzene or xylene. It is further a feature of this invention that coating emulsions embodying the novel elastomers of the present invention can be prepared readily by stirring a hot solution of the elastomer in an organic solvent containing an acidic emulsifying agent into an aqueous solution of ammonia or an aqueous solution of a water soluble nitrogenous organic base, such as morpholine, or reversing this order.

The novel elastomers of the present invention appear to be the result, to some extent at least, of a chemical reaction between the ethyl cellulose, the auxiliary resin and the hydrogenated fatty acid ester. This is evidenced in part by the fact that the analysis of extraction residues and products of extraction with organic solvents reveals the partial decomposition of the substituted polyphenyl component and also the modified solubility and viscosity characteristics of the extraction products. It is not possible to state definitely the nature of the reactions involved or the chemical structure of the product. Chemical decomposition of the substituted polyphenyl hydrocarbon, hydrogen bonding and reaction through secondary valences are among the possible reactions taking place.

Suitable types of ethyl cellulose for the purpose of this invention are those having a viscosity in the range of 100-300 or higher, and desirably in the vicinity of 300. Mixtures of two or more types of ethyl cellulose having viscosities, for example, of 100 and 300 respectively, may be used. The viscosity of the ethyl cellulose employed is determined by the falling ball method on a 5% by weight solution in 80:20 toluene-ethanol solvent at 25° C. The absolute viscosity, expressed in centipoises, is used to designate the viscosity types.

Suitable polyphenyl hydrocarbon derivatives for the purpose of this invention are solid crystalline nitro- or aryl-substituted polyphenyl hydrocarbons, such as ortho, meta and para nitro diphenyl, 2,2'-, 3,3'-, 4,4'- and 2,4'-dinitro diphenyls, ortho-, meta- and para-diphenyl benzene and mixtures of the respective substituted polyphenyls.

Suitable auxiliary resins for the purpose of this invention are the phenol-aldehyde thermo-setting resins, such as phenol-formaldehyde resins, phenol-butyraldehyde resins, o-cresol-formaldehyde resin, m-cresol-acetaldehyde resin; oil-soluble resins, such as tertiary butyl phenol-aldehyde resins, m-p-cresol-benzaldehyde-acetaldehyde resin, phenol-acetylene-acetaldehyde resin, methylene-diphenylamine-phenol resin; polycoumarone-indene resins; isomerized terpene resins; ester gum, alkyd resins, such as glycolphthalic anhydride-succinic acid resin, dihydroxy stearic acid-maleic acid resin, glycerine-adipic acid resin; and aryl sulfonamide-aldehyde resins, such as benzene sulfonamide-formaldehyde resin and o- and p-toluene sulfonamide-formaldehyde resin.

Suitable hydrogenated fatty acid esters for the purpose of this invention are hydrogenated castor oil and hydrogenated glycerides of oleic, stearic and palmitic acids. As an alternative, an unhydrogenated fatty acid ester may be incorporated in the fatty acid mixture and hydrogen gas may thereupon be passed into the mixture.

Suitable acidic emulsifying agents for the purpose of this invention are distilled linoleic and linolenic acids, stearic acid, oleic acid, ricinoleic acid and other higher fatty acids.

Suitable alkaline emulsifying agents for the purpose of this invention are: ammonia, morpholine, 2-amino-2 methyl-1-propanol and triethanolamine.

The proportions of the respective components which are reacted to form the novel elastomers of this invention may be varied over a wide range. It is not feasible to set a definite limit to this range because the proportions of the components depend upon the characteristics desired in the product and the purpose for which the elastomer is intended. In general, the ratio of substituted polyphenol hydrocarbon to ethyl cellulose is desirably within the range of 0.4-2. Likewise, the ratio of auxiliary resin to ethyl cellulose is desirably within the range of 0-1.5. Also the range of hydrogenated higher fatty acid esters to ethyl cellulose is within the range of 0-1.0. The range of proportions of the components of the novel elastomers and elastomer compositions of this invention will be further illustrated in the examples which follow. These examples, however, are to be construed merely as illustrative and not as limiting the scope of the invention.

*Example I*

One hundred ten parts by weight of meta diphenyl benzene are melted in an oil-jacketed mixer and 45 parts by weight of ester gum are incorporated in the hot melt. The temperature is raised gradually to 160° and 80 parts by weight of ethyl cellulose having a viscosity of 100 centipoises are incorporated in the hot melt. The temperature of 160° C. is maintained for a period of 40 minutes. The molten mass is then poured into a mold or flowed onto a plate and cooled. The cooled product is uniform in structure, flexible and of the consistency of a tough rubber. The elastomer thus formed may be worked on hot rolls to form sheet material or may be molded into various shapes, such as washers, gaskets and the like.

*Example II*

One hundred twenty parts by weight of ortho diphenyl benzene having a viscosity of 300 centipoises are melted on hot rolls and 45 parts by weight of paracoumarone-indene resin, known to the trade as "Cumar" resin, are incorparated in the hot melt on the rolls. The temperature of the rolls is then raised gradually so that the hot melt reaches a temperature above 140° C. and preferably in the vicinity of 160° C. At this point, 80 parts by weight of ethyl cellulose is added to the hot melt and the reaction mixture is agitated on the rolls for a period of 25 minutes. The mass is then cooled and shaped into desired forms. The elastomer of this example is pliable and flexible and resembles rubber in physical appearance. The elastomer may be cold-worked on rolls to form sheet material which is suitable for the preparation of gaskets and washers.

*Example III*

| | Parts |
|---|---|
| Ethyl cellulose (viscosity 100 centipoises) | 12 |
| Mixture containing 95% ortho diphenyl benzene and 5% meta diphenyl benzene | 20 |
| Ester gum | 20 |
| Hydrogenated castor oil | 5 |
| Mixture of linoleic and linolenic acids | 6 |

The above materials, with the exception of the ethyl cellulose are melted together in the manner as described in Example I and the ethyl cellulose is incorporated in the hot melt under the conditions described in Example I. The reaction product is poured into 50 parts of xylene and the xylene is thoroughly agitated to form a uniform dispersion of the reaction product therein. A hot solution containing 4 parts of morpholine in 35 parts of water is added to the xylene dispersion and the mixture is stirred rapidly for several minutes to emulsify the components. The emulsion thus formed is creamy and white and may be applied to surfaces of paper, metal, wood or leather to provide a tough rubbery finish.

Example IV

| | Grams |
|---|---|
| Ethyl cellulose (viscosity 100 centipoises) | 80 |
| Ortho nitro diphenyl | 120 |
| Ester gum | 80 |
| Hydrogenated castor oil | 20 |

The reaction is conducted according to the method of Example I. The resulting elastomer is a tough, flexible rubbery material with a slight tack and no tendency to bloom, i. e. to exude crystals of an unreacted component. The elastomer is useful as an extender for synthetic rubber.

The substitution of a phenol-aldehyde resin, such as phenol formaldehyde resin, for the ester gum which is a resin derived from the esterification of rosin and glycerine, resulted in a similar product characterized by the absence of tack.

Example V

| | Grams |
|---|---|
| Ethyl cellulose (viscosity 100 centipoises) | 80 |
| Ortho nitro diphenyl | 120 |
| Mixture of 95% meta diphenyl benzene and 5% of a blend of ortho and para diphenyl benzene | 40 |
| Phenol-formaldehyde resin | 120 |
| Hydrogenated castor oil | 25 |

The reaction was conducted according to the method of Example I. The resulting elastomer was tough and possessed the characteristic of great stability and absence of blooming over a long period of time.

The mixture of diphenyl benzenes may be the material known to the trade as Santowax-M. The phenol formaldehyde resin may be the material known to the trade as Durez-219. The hydrogenated castor oil may be the material known to the trade as "Opal wax."

Example VI

| | Grams |
|---|---|
| Ethyl cellulose (viscosity 300 centipoises) | 90 |
| Ortho nitro diphenyl | 20 |
| Mixture of 95% meta diphenyl benzene and 5% of a blend of ortho and para diphenyl benzenes | 60 |
| Mixture of 95% ortho diphenyl benzene and 5% of meta diphenyl benzene | 30 |
| Hydrogenated castor oil | 20 |

The elastomer resulting from the reaction of these materials according to the method of Example I was a hard, tough, rubber-like material suitable for the manufacture of heels for shoes, and similar articles in which rigidity and toughness combined with elasticity are necessary characteristics.

The mixture of 95% ortho diphenyl benzene and 5% meta diphenyl benzene may be the material known to the trade as Santowax-O.

Example VII

| | Grams |
|---|---|
| Ethyl cellulose (viscosity 300 centipoises) | 160 |
| Mixture of 95% meta diphenyl benzene and 5% of a blend of ortho and para diphenyl benzene | 120 |
| Mixture of 95% ortho diphenyl benzene and 5% meta diphenyl benzene | 70 |
| Ortho nitro diphenyl | 40 |
| Ester gum | 120 |
| Hydrogenated castor oil | 15 |

The elastomer resulting from the reaction of the above materials according to the method of Example I was found to possess substantially the characteristics of the elastomer of Example VI.

The ester gum may be the material known to the trade as ester gum "B-L," a product of American Cyanamide Company.

Example VIII

| | Grams |
|---|---|
| Ethyl cellulose (viscosity 300 centipoises) | 150 |
| Mixture of 95% meta diphenyl benzene and 5% of a blend of ortho and para diphenyl benzenes | 120 |
| Mixture of 95% ortho diphenyl benzene and 5% meta diphenyl benzene | 60 |
| Ortho nitro diphenyl | 40 |
| Hydrogenated castor oil | 15 |

The elastomer resulting from the reaction of the above materials according to the method of Example I was found to possess a higher softening point than the elastomer of Example VII.

Example IX

| | Grams |
|---|---|
| Ethyl cellulose (viscosity 300 centipoises) | 160 |
| Mixture of 95% meta diphenyl benzene and 5% of a blend of ortho and para diphenyl benzenes | 90 |
| Mixture of 95% ortho diphenyl benzene and 5% meta diphenyl benzene | 117 |
| Ester gum | 98 |
| Hydrogenated castor oil | 25 |

The elastomer resulting from the reaction of these materials according to the method of Example I was found to possess very desirable characteristics as a substitute for rubber where a rigid but elastic material is required.

Example X

| | Grams |
|---|---|
| Ethyl cellulose (viscosity 300 centipoises) | 160 |
| Mixture of 95% ortho diphenyl benzene and 5% meta diphenyl benzene | 210 |
| Ester gum | 90 |
| Hydrogenated castor oil | 50 |

The elastomer resulting from the reaction of the above materials according to the method of Example I was found to possess excellent characteristics as a tough elastic material for the preparation of gaskets, washers and tank linings where resistance to corrosion and abrasion are encountered.

Example XI

| | Grams |
|---|---|
| Ethyl cellulose (viscosity 300 centipoises) | 90 |
| Mixture of 95% meta diphenyl benzene and 5% of ortho and para diphenyl benzene | 90 |
| Mixture of 95% ortho diphenyl benzene and 5% of meta diphenyl benzene | 10 |
| Para toluene sulfonamide - formaldehyde resin | 30 |
| Hydrogenated castor oil | 30 |

The elastomer resulting from the reaction of these materials, according to the method of Example I, possessed the characteristics of the elastomer of Example X together with an increased degree of hardness. The elastomer may be extended with 15% to 20% of "Gilsonite" at a temperature of approximately 295° F., and the resulting elastomer possesses a relatively high degree of toughness combined with sufficient elasticity to render the material highly useful for such purposes as conveyor belt linings.

Example XII

| | Grams |
|---|---|
| Ethyl cellulose (viscosity 100 centipoises) | 150 |
| Mixture of 95% meta diphenyl benzene and 5% of a blend of ortho and para diphenyl benzenes | 100 |
| Mixture of 95% ortho diphenyl benzene and 5% meta diphenyl benzene | 130 |
| Ortho nitro diphenyl | 30 |
| Ester gum | 60 |
| Phenol formaldehyde resin | 30 |
| Hydrogenated castor oil | 45 |

The elastomer was prepared according to the method of Example I and the product was cast into the form of a slab and allowed to cool. The elastomer of this example was found to be a very stable, tough and elastic material suitable for many of the purposes for which a rubber possessing similar characteristics is normally used.

Example XIII

| | Grams |
|---|---|
| Ethyl cellulose (viscosity 300 centipoises) | 80 |
| Mixture of 95% ortho diphenyl benzene and 5% meta diphenyl benzene | 120 |
| Paracoumarone-indene resin | 45 |
| Hydrogenated castor oil | 12½ |

The diphenyl benzenes, resin and hydrogenated castor oil are melted together and the temperature is raised to slightly higher than 140° C. The ethyl cellulose is thereupon incorporated and the temperature is raised gradually to 180° C. and maintained at that point for at least 25 minutes. The hot melt is thereupon poured or cast into suitable molds. The polycoumarone-indene resin employed in this instance may be the material known to the trade as "Cumar MH-9." The elastomer of this example is hard and tough with a moderate degree of elasticity.

Example XIV

| | Grams |
|---|---|
| Ethyl cellulose (viscosity 100 centipoises) | 15 |
| Mixture of 95% ortho diphenyl benzene and 5% meta diphenyl benzene | 20 |
| Isomerized terpene resin (condensation product of dipentene with phenol and formaldehyde) | 20 |
| Hydrogenated castor oil | 7 |

The materials were reacted according to the method of Example I. After the reaction was complete, 10 grams of a mixture of linoleic and linolenic acids and 100 cc. of xylene were incorporated into the hot melt. The melt thus modified was stirred into a solution of 9 grams of morpholine in 90 cc. of water and agitation was continued thereafter until an emulsion was formed. The emulsion was found to be highly suitable for coating articles of paper, wood, leather and metal and the coatings thus provided were found to be tough, flexible and resistant to abrasion.

Example XV

| | Grams |
|---|---|
| Ethyl cellulose (viscosity 300 centipoises) | 12 |
| Ortho nitro diphenyl | 20 |
| Ester gum | 20 |
| Hydrogenated castor oil | 6 |

These materials were reacted according to the method of Example I with the exception that the reaction temperature was maintained at 190°–200° C. Six grams of a mixture of linoleic and linolenic acids and 50 grams of xylene were thereupon incorporated in the melt. The melt thus modified was stirred into a solution containing 3 grams of morpholine and 35 grams of water and agitation was continued until an emulsion was formed. The emulsion of this example was found to be suitable for coating purposes and particularly for metal articles. The film resulting when the emulsion was dried was found to be relatively hard with a moderate degree of elasticity.

Example XVI

| | Grams |
|---|---|
| Ethyl cellulose (viscosity 100 centipoises) | 20 |
| Mixture of 95% ortho diphenyl benzene and 5% meta diphenyl benzene | 18 |
| Ortho nitro diphenyl | 5 |
| Phenol-formaldehyde resin | 35 |
| Hydrogenated castor oil | 7 |

This elastomer, prepared according to the method of Example I, was dissolved in a benzene-xylene mixture in the ratio of 2½ to 4 pounds per gallon of the solvent. The resulting solution was found to possess great utility as a dipping medium for metal objects, such as magnesium castings, to provide protecting coatings on such objects.

Example XVII

| | Pounds |
|---|---|
| Ethyl cellulose (viscosity 300 centipoises) | 9.5 |
| Mixture of 95% ortho diphenyl benzene and 5% meta diphenyl benzene | 13 |
| Phenol-aldehyde resin | 13 |
| Mixture of linoleic and linolenic acids | 6.5 |
| Hydrogenated castor oil | 1 |
| Xylene | 51.5 |
| Water | 62 |
| Aqueous ammonia (28% $NH_3$) | 1.5 |

The diphenyl benzenes and the phenol-aldehyde resin were melted in an oil-jacketed mixer at a temperature of 130° C. The ethyl cellulose was added and the temperature was raised to 160° C. over a period of 30 minutes and maintained at that temperature for 20 minutes. Thereupon the reaction mixture was cooled to 130° C. The xylene and fatty acids were added quickly. Mixing was continued for 10 minutes to give an homogeneous solution at a temperature of about 110° to 120° C. The solution was then agitated rapidly until emulsification had taken place. Agitation was continued for an additional 20 minutes. The product thus formed was a very thick emulsion of low solids content. When applied to a surface of paper, wood, leather or metal, it formed a dull, white, opaque film which possessed the characteristics of toughness and elasticity. In the preparation of this material, the ammonia may be replaced by morpholine, triethanolamine or by 2-amino-2 methyl-1-propanol.

Example XVIII

A suitable solvent for dissolving the elastomers or the elastomer compositions of this invention is prepared according to the following formula:

| | Liters |
|---|---|
| Denatured alcohol (containing gasoline and ethyl acetate) | 30 |
| Xylene | 20 |
| Benzene | 15 |
| Rubber solvent (initial boiling point 100° F.—end point 260° F.) | 35 |

The usual rate of dilution of the elastomer or the elastomer composition is 2½ pounds of solid per gallon of solution. This may be increased to as much as 4 pounds per gallon or more. Elastomer dispersions thus prepared have been found to be excellent dipping mediums for the purpose of coating articles of cloth, wood and metal. For example, magnesium castings, when immersed in the dispersion, are provided thereby with a protective coating which resists abrasion and weathering.

In blending the elastomers of the present invention with synthetic rubber, such as neoprene rubber or butadiene rubber, it is desirable to employ a small quantity of a solvent for the elastomer initially to accelerate the dispersion of the elastomer in the synthetic rubber. In this manner, from 5% to 75% or more of the elastomer, based on the synthetic rubber, may be used to extend the synthetic rubber and thereby to lower the cost of the product without detracting from the useful characteristics of the synthetic rubber. Elastomers, which have been extended by incorporation of auxiliary resins, such as rosin-glycerine resin (ester gum), phenol-aldehyde resins and isomerized terpene resins are desirably employed as extenders for synthetic rubbers.

In the manufacture of rubbery articles, such as gaskets and washers, embodying the elastomers of this invention, it is desirable to prepare a 50% solution of the elastomer in xylene and to pour the hot solution into appropriate molds. The cast solution is allowed to air-dry for 25 hours or more to expel the solvent and to form a rubbery solid. The xylene is desirably incorporated with the reactants after a melt has been established.

In the manufacture of a tougher variety of article, such as washers and gaskets for application to acid, hot water or hot oil fittings, it is desirable to cast a hot melt of the elastomer in molds and thereafter to reduce the thermal plasticity of the molded article by vulcanization with sulfur or by incorporating an additional quantity of a hard resin such as an aryl sulfonamide-aldehyde resin.

Within relatively wide limits, the temperature at which the reaction is conducted in the preparation of the elastomers of the present invention appears to have little influence on the characteristics of the final product, except, in some instances, at higher temperatures a somewhat darker, harder and tougher product is produced. The duration of the heating period appears to have a definite but minor influence in the same direction.

The novel elastomers of this invention possess great utility in the field of rubber substitutes for many purposes. For example, the elastomers may be used with success in the manufacture of gaskets, washers, acid-resistant tank linings, roofing compositions, vibration dampers, conveyor belt linings, flooring, chute linings and other articles for which a tough rubbery abrasion-resistant material is desired. Coating emulsions embodying these elastomers are particularly useful in manufacturing acid-proof clothing, imparting corrosion and abrasion resistance to sheet metal, metallic and non-metallic particles and improving the impermeability of cloth for balloons and other purposes for which a rubber abrasion and corrosion-resistant surface is desired. The novel elastomers of this invention are also highly useful as low-cost extenders for synthetic rubbers.

Inasmuch as the foregoing description comprises preferred embodiments of the invention, it is to be understood that the invention is not limited thereto and that changes and modifications may be made therein, without departing substantially from the invention which is defined in the appended claims.

I claim:

1. An elastomer comprising the product of the thermal reaction of water-insoluble ethyl cellulose, at least one normally solid, crystalline substituted polyphenyl hydrocarbon selected from the group consisting of ortho nitro-diphenyl, ortho, meta and para diphenyl benzenes and mixtures of said substituted hydrocarbons; and a hydrogenated higher fatty acid glyceride; said materials, with the exception of ethyl cellulose, being formed into a hot melt, said ethyl cellulose being incorporated therein and said melt thereupon heated at a temperature between 140-240° C. for a period of time ranging from 20 minutes to 4 hours.

2. A coating emulsion comprising, in one phase, an acid-emulsifying agent and an elastomer formed by the thermal reaction of water-insoluble ethyl cellulose, at least one normally solid, crystalline substituted polyphenyl hydrocarbon selected from the group consisting of ortho nitro-diphenyl, ortho, meta and para diphenyl benzenes and mixtures of said substituted hydrocarbons; and a hydrogenated higher fatty acid glyceride; and in the other phase, an alkaline-emulsifying agent dissolved in water; said hydrocarbons being formed into a hot melt, said ethyl cellulose being incorporated therein and said melt thereupon heated at a temperature between 140-340° C. for a period of time ranging from 20 minutes to 4 hours, after which said thermal reaction product is cooled to normal temperature.

3. An elastomer composition comprising the product of the thermal reaction of one part by weight of water-insoluble ethyl cellulose having a viscosity of 100-300 centipoises; 0.4-2 parts by weight of at least one normally solid, crystalline substituted polyphenyl hydrocarbon selected from the group consisting of ortho nitro diphenyl, ortho, meta and para diphenyl benzenes and mixtures of said substituted hydrocarbons; and 0.1-1.0 parts by weight of a hydrogenated higher fatty acid glyceride; said hydrocarbons and higher fatty acid glyceride formed into a hot melt into which said ethyl cellulose is incorporated and the temperature maintained thereafter between 140°-240° C. for a period of time ranging from 20 minutes to 4 hours, after which said thermal reaction product is cooled to normal temperature.

4. A coating emulsion comprising, as one phase, from 5% to 20% of an acidic emulsifying agent and an elastomer composition, which composition is the thermal reaction product of one part by weight of water-insoluble ethyl cellulose having a viscosity of 100-300 centipoises; 0.4-2 parts by weight of at least one normally solid, crystalline substituted polyphenyl hydrocarbon selected from the group consisting of ortho nitro diphenyl, ortho, meta and para diphenyl benzenes and mixtures of said substituted hydrocarbons; and 0.1-1.0 parts by weight of a hydrogenated higher fatty acid glyceride; said hydrocarbon and higher fatty acid glyceride formed into a hot melt into which said ethyl cellulose is incorporated and the temperature maintained thereafter between 140°-240° C. for a period of time ranging from 20 minutes to 4 hours, after which said thermal reaction product is cooled to normal temperature.

5. The process of making an elastomer composition which comprises forming a hot melt consisting of 0.4-2.0 parts by weight of at least one normally solid, crystalline substituted polyphenyl hydrocarbon selected from the group consisting of ortho nitro diphenyl, ortho, meta and para diphenyl benzenes and mixtures of said substituted hydrocarbons; and 0.1-1.0 parts by weight of a hydrogenated fatty acid glyceride; incorporating into said melt one part by weight of water-insoluble ethyl cellulose having a viscosity in the range of 100-300 centipoises, heating said melt to a temperature in the range of 140°-240° C. for a time within the range of 25 minutes to 4 hours and subsequently cooling said melt.

6. A coating composition comprising a normally liquid aromatic hydrocarbon dispersion of an elastomer composition comprising the product of the thermal reaction of water-insoluble ethyl cellulose, at least one normally solid, crystalline substituted polyphenyl hydrocarbon selected from the group consisting of ortho nitro diphenyl, ortho, meta and para diphenyl benzenes and mixtures of said substituted hydrocarbons; and a hydrogenated higher fatty acid glyceride; said hydrocarbons and higher fatty acid glyceride formed into a hot melt into which said ethyl cellulose is incorporated and the temperature maintained thereafter between 140°-240° C. for a period of time ranging from 20 minutes to 4 hours, after which said thermal reaction product is cooled to normal temperature.

7. A coating composition comprising a normally liquid aromatic hydrocarbon dispersion of an elastomer composition comprising the product of the thermal reaction of one part by weight of water-insoluble ethyl cellulose having a viscosity of 100-300 centipoises; 0.4-2 parts by weight of at least one normally solid, crystalline substituted polyphenyl hydrocarbon selected from the group consisting of ortho nitro diphenyl, ortho, meta and para diphenyl benzenes and mixtures of said substituted hydrocarbons; and 0.1-1.0 parts by weight of a hydrogenated higher fatty acid glyceride; said hydrocarbons and higher fatty acid glyceride formed into a hot melt into which said ethyl cellulose is incorporated and the temperature maintained thereafter between 140-240° C. for a period of time ranging from 20 minutes to 4 hours, after which said thermal reaction product is cooled to normal temperature.

HARRY KELLER.